US012017660B2

(12) United States Patent
Askari et al.

(10) Patent No.: US 12,017,660 B2
(45) Date of Patent: Jun. 25, 2024

(54) ARCHITECTURE AND METHODOLOGY OF ADAPTIVE TIRE FORCE PREDICTION FOR INTEGRATED VEHICLE MOTION CONTROL

(71) Applicant: GM Global Technology Operations LLC, Detroit, MI (US)

(72) Inventors: Hassan Askari, Markham (CA); Seyedeh Asal Nahidi, North York (CA); Shamim Mashrouteh, Markham (CA); Ruixing Long, Windsor (CA); Bharath Pattipati, South Lyon, MI (US); SeyedAlireza Kasaiezadeh Mahabadi, Novi, MI (US); Hualin Tan, Novi, MI (US); Lapo Frascati, Dicomano (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 365 days.

(21) Appl. No.: 17/518,237

(22) Filed: Nov. 3, 2021

(65) Prior Publication Data

US 2023/0139179 A1    May 4, 2023

(51) Int. Cl.
| | |
|---|---|
| *B60W 40/101* | (2012.01) |
| *B60C 23/04* | (2006.01) |
| *B60W 30/02* | (2012.01) |
| *B60W 40/12* | (2012.01) |

(52) U.S. Cl.
CPC ....... *B60W 40/101* (2013.01); *B60C 23/0486* (2013.01); *B60W 30/02* (2013.01); *B60W 40/12* (2013.01); *B60W 2520/26* (2013.01)

(58) Field of Classification Search
CPC .... B60W 40/101; B60W 30/02; B60W 40/12; B60W 2520/26; B60C 23/0486
See application file for complete search history.

(56) References Cited

U.S. PATENT DOCUMENTS

| | | | |
|---|---|---|---|
| 7,330,785 | B2 | 2/2008 | Odenthal et al. |
| 10,124,807 | B2 | 11/2018 | Petrucci et al. |
| 10,407,035 | B1 | 9/2019 | Gadda et al. |
| 2006/0267750 | A1 | 11/2006 | Lu et al. |

(Continued)

FOREIGN PATENT DOCUMENTS

CN         108646756 B   *   1/2021   ........... G05D 1/0214

*Primary Examiner* — Behrang Badii
*Assistant Examiner* — Jay Khandpur
(74) *Attorney, Agent, or Firm* — Vivacqua Crane, PLLC

(57) ABSTRACT

A system for adaptive tire force prediction in a motor vehicle includes a control module that executes program code portions that receive real-time static and dynamic data from motor vehicle sensors, that model forces at each tire of the motor vehicle at one or more incremental time steps, that estimate actual forces at each tire of the motor vehicle at each of the one or more incremental time steps, that adaptively predict tire forces at each tire of the motor vehicle at each of the one or more incremental time steps, that generate one or more control commands for actuators of the motor vehicle, that capture discrepancies between real-time force estimations and nominal force calculations at each tire of the motor vehicle, and that apply compensation parameters to reduce tracking errors in the one or more control commands to the one or more actuators of the motor vehicle.

18 Claims, 4 Drawing Sheets

(56) References Cited

U.S. PATENT DOCUMENTS

| | | | |
|---|---|---|---|
| 2020/0023852 A1* | 1/2020 | Yi | B60W 40/068 |
| 2020/0102043 A1* | 4/2020 | Zhang | B62J 45/415 |
| 2020/0290625 A1* | 9/2020 | Berntorp | B60W 30/18172 |
| 2020/0317018 A1* | 10/2020 | Nong | B60G 17/01908 |
| 2021/0229679 A1* | 7/2021 | Gießibl | B60W 10/119 |
| 2021/0245732 A1* | 8/2021 | Nahidi | B60W 30/02 |

\* cited by examiner

ARCHITECTURE AND METHODOLOGY OF ADAPTIVE TIRE FORCE PREDICTION FOR INTEGRATED VEHICLE MOTION CONTROL

INTRODUCTION

The present disclosure relates to control systems for motor vehicles, and more specifically to systems and methods for accurately modeling automotive tire characteristics.

Static and dynamic motor vehicle control systems are increasingly being used to manage a wide variety of static and dynamic motor vehicle performance characteristics. This is especially true with respect to challenging driving scenarios involving tire slip. In many challenging driving scenarios, control actions such as wheel and/or axle torques should be allocated in an optical manner such that tire capacity is fully utilized in longitudinal and lateral directions. Typical tire capacity management is performed within on-board computing platforms or controllers and sensors, including inertial measurement units (IMUs) to measure how the motor vehicle moves in space, referred to as vehicle dynamics. IMUs measure vehicle acceleration in three axes: x (forward/back), y (side-to-side), and z (up/down). IMUs additionally measure how quickly the motor vehicle is turning about the three axes, referred to as the pitch rate (about y), yaw rate (about z), and roll rate (about x). On-board computing platforms or controllers use the measurement data to estimate forces acting on the vehicle.

While current systems and methods for tire force prediction in operate for their intended purpose, there is a need for new and improved systems and methods for tire force prediction that are capable of managing motor vehicle control over the lifespan of a tire and under numerous controlled and uncontrolled tire operational conditions while maintaining or reducing cost and complexity, improving simplicity, and while providing increased redundancy and robustness.

SUMMARY

According to several aspects of the present disclosure a system for adaptive tire force prediction in a motor vehicle includes one or more sensors disposed on the motor vehicle, the plurality of sensors measuring real-time static and dynamic data about the motor vehicle. The system further includes one or more actuators disposed on the motor vehicle, the plurality of actuators altering static and dynamic behavior of the motor vehicle. The system further includes a control module having a processor, a memory, and input/output (I/O) ports, the control module executing program code portions stored in the memory. The program code portions include: a first program code portion that receives, via the I/O ports, the real-time static and dynamic data from the one or more sensors, a second program code portion that models forces at each tire of the motor vehicle at one or more incremental time steps, and a third program code portion that estimates actual forces at each tire of the motor vehicle at each of the one or more incremental time steps. The program code portions further include a fourth program code portion that adaptively predicts tire forces at each tire of the motor vehicle at each of the one or more incremental time steps, a fifth program code portion that generates one or more control commands for the one or more actuators of the motor vehicle, and a sixth code portion that captures discrepancies between real-time force estimations and nominal force calculations at each tire of the motor vehicle, and applies compensation parameters to reduce tracking errors in the one or more control commands to the one or more actuators of the motor vehicle.

In another aspect of the present disclosure the first program code portion further receives real-time static and dynamic data from one or more of: inertial measurement units (IMUs) capable of measuring position, orientation, acceleration, and velocity in at least three dimensions, wheel speed sensors capable of measuring angular speeds of wheels of the motor vehicle, and throttle position sensors capable of measuring a throttle position of the motor vehicle. The first program code portion further receives real-time static and dynamic data from accelerator position sensors capable of measuring a position of an accelerator pedal of the motor vehicle, and tire pressure monitoring sensors capable of measuring pressures of tires of the motor vehicle.

In still another aspect of the present disclosure the real-time static and dynamic data further includes lateral velocity, longitudinal velocity, yaw rate, wheel angular velocity, and longitudinal, lateral, and normal forces on each tire of the motor vehicle.

In still another aspect of the present disclosure the second program code portion further includes a piecewise affine model that generates predictions of longitudinal and lateral forces on each tire of the motor vehicle.

In still another aspect of the present disclosure the piecewise affine model further includes a program code portion that calculates a linear approximation of longitudinal forces, lateral forces, self-aligning torques, and coefficients of friction at a contact patch between the tire and a surface such that the linear approximation models tire force behavior in both linear and nonlinear regions at one or more incremental time steps.

In still another aspect of the present disclosure the third program code portion further includes utilizing a lookup table to estimate actual forces at each tire of the motor vehicle based on the real-time static and dynamic data from the one or more sensors.

In still another aspect of the present disclosure the fourth program code portion adaptively predicts tire forces at each tire of the motor vehicle at each of the one or more incremental time steps to compensate for effects of tire deformation, tire wear, tire temperature, tire inflation pressure, and a coefficient of friction of a surface in contact with the tire at a contact patch.

In still another aspect of the present disclosure tire deformation is quantified in terms of longitudinal and lateral slip including a slip angle and slip ratio.

In still another aspect of the present disclosure slip angle and slip ratio are defined respectively by:

$$\alpha_{i,j} = \tan^{-1}\left(\frac{v_{y_{ij}}}{v_{x_{ij}}}\right), \kappa_{i,j} = \frac{(R_e \omega_{i,j} - v_{x_{ij}})}{v_{x_{ij}}}$$

where actual tire forces are mathematically defined by:

$$\min_{c_1, c_2, c_3, c_4, c_5} \sum_{i}^{n} (F_z \mu_{x_i} - y_i)^2$$

where $y_i$ represents a force calculation for each of the tires of the motor vehicle, and wherein the coefficients $c_1$, $c_2$, $c_3$, $c_4$, $c_5$ are based on actual tire forces in different slip angles and different normal forces using nonlinear least squares data.

In still another aspect of the present disclosure the tire forces are predicted based on predicted state variables and the model of forces on each of the tires of the motor vehicle in X and Y directions is defined as:

$$F_{x_{i,j}} = F_{z_{i,j}} \mu^*_{x_{i,j}} \frac{\kappa_{i,j}}{|\kappa_{i,j}|} \min(c_1 \min(c_4|\kappa_{i,j}| + c_5, |\kappa_{i,j}|),$$
$$c_2 \min(c_4|\kappa_{i,j}| + c_5, |\kappa_{i,j}|) + c_3);$$
$$F_{y_{i,j}} = F_{z_{i,j}} \mu^*_{y_{i,j}} \frac{\alpha_{i,j}}{|\alpha_{i,j}|} \min(c_1 \min(c_4|\alpha_{i,j}| + c_5, |\alpha_{i,j}|),$$
$$c_2 \min(c_4|\alpha_{i,j}| + c_5, |\alpha_{i,j}|) + c_3);$$

and where the tire forces are utilized to calculate state variables such as wheel angular velocities according as $J_w \dot{\omega}_{i,j} = T_{i,j} - R_e F_{x_{i,j}}$.

In still another aspect of the present disclosure a method for adaptive tire force prediction in a motor vehicle includes processing static and dynamic motor vehicle information through a control module, the control module having a processor, a memory, and the I/O ports, the control module executing program code portions stored in the memory. The program code portions measure real-time static and dynamic data with one or more sensors disposed on the motor vehicle; utilize one or more actuators disposed on the motor vehicle to alter static and dynamic behavior of the motor vehicle, and receive, via the I/O ports, the real-time static and dynamic data from the one or more sensors. The program code portions further model forces at each tire of the motor vehicle at one or more incremental time steps, estimate estimating actual forces at each tire of the motor vehicle at each of the one or more incremental time steps, and adaptively predict tire forces at each tire of the motor vehicle at each of the one or more incremental time steps. The program code portions further generate one or more control commands for the one or more actuators of the motor vehicle, capture discrepancies between real-time force estimations and nominal force calculations at each tire of the motor vehicle, and apply compensation parameters to reduce tracking errors in the one or more control commands to the one or more actuators of the motor vehicle.

In still another aspect of the present disclosure the method further includes program code portions that receive real-time static and dynamic data from one or more of: inertial measurement units (IMUs) capable of measuring position, orientation, acceleration, and velocity in at least three dimensions, wheel speed sensors capable of measuring angular speeds of wheels of the motor vehicle, throttle position sensors capable of measuring a throttle position of the motor vehicle, accelerator position sensors capable of measuring a position of an accelerator pedal of the motor vehicle, and tire pressure monitoring sensors capable of measuring pressures of tires of the motor vehicle.

In still another aspect of the present disclosure measuring real-time static and dynamic data further includes measuring lateral velocity, longitudinal velocity, yaw rate, wheel angular velocity, and longitudinal, lateral, and normal forces on each tire of the motor vehicle.

In still another aspect of the present disclosure the method further includes program code portions that generate predictions of longitudinal and lateral forces on each tire of the motor vehicle with a piecewise affine model.

In still another aspect of the present disclosure generating predictions of longitudinal and lateral forces on each tire of the motor vehicle with a piecewise affine model further includes calculating a linear approximation of longitudinal forces, lateral forces, self-aligning torques, and coefficients of friction at a contact patch between the tire and a surface such that the linear approximation models tire force behavior in both linear and nonlinear regions at one or more incremental time steps.

In still another aspect of the present disclosure the method further includes utilizing a lookup table to estimate actual forces at each tire of the motor vehicle based on the real-time static and dynamic data from the one or more sensors.

In still another aspect of the present disclosure the method further includes adaptively predicting tire forces at each tire of the motor vehicle at each of the one or more incremental time steps to compensate for effects of tire deformation, tire wear, tire temperature, tire inflation pressure, and a coefficient of friction of a surface in contact with the tire at a contact patch.

In still another aspect of the present disclosure the method further includes quantifying tire deformation in terms of longitudinal and lateral slip including a slip angle and a slip ratio, wherein slip angle and slip ratio are defined respectively by:

$$\alpha_{i,j} = \tan^{-1}\left(\frac{v_{y_{ij}}}{v_{x_{ij}}}\right), \kappa_{i,j} = \frac{(R_e \omega_{i,j} - v_{x_{ij}})}{v_{x_{ij}}}$$

wherein actual tire forces are mathematically defined by:

$$\min_{c_1, c_2, c_3, c_4, c_5} \sum_i^n (F_z \mu_{x_i} - y_i)^2$$

where $y_i$ represents a force calculation for each of the tires of the motor vehicle, and wherein the coefficients $c_1$, $c_2$, $c_3$, $c_4$, $c_5$ are based on actual tire forces in different slip angles and different normal forces using nonlinear least squares data.

In still another aspect of the present disclosure the method further includes predicting tire forces based on predicted state variables and the model of forces on each of the tires of the motor vehicle in X and Y directions is defined as:

$$F_{x_{i,j}} = F_{z_{i,j}} \mu^*_{x_{i,j}} \frac{\kappa_{i,j}}{|\kappa_{i,j}|} \min(c_1 \min(c_4|\kappa_{i,j}| + c_5, |\kappa_{i,j}|),$$
$$c_2 \min(c_4|\kappa_{i,j}| + c_5, |\kappa_{i,j}|) + c_3);$$
$$F_{y_{i,j}} = F_{z_{i,j}} \mu^*_{y_{i,j}} \frac{\alpha_{i,j}}{|\alpha_{i,j}|} \min(c_1 \min(c_4|\alpha_{i,j}| + c_5, |\alpha_{i,j}|),$$
$$c_2 \min(c_4|\alpha_{i,j}| + c_5, |\alpha_{i,j}|) + c_3);$$

and wherein the tire forces are utilized to calculate state variables such as wheel angular velocities according to the following equation: $J_w \dot{\omega}_{i,j} = T_{i,j} - R_e F_{x_{i,j}}$.

In still another aspect of the present disclosure a method for adaptive tire force prediction in a motor vehicle includes processing static and dynamic motor vehicle information through a control module, the control module having a processor, a memory, and the I/O ports, the control module executing program code portions stored in the memory. The program code portions measure real-time static and dynamic data with one or more sensors disposed on the motor vehicle, the real-time static and dynamic data including: utilizing one or more actuators disposed on the motor vehicle to alter static and dynamic behavior of the motor vehicle, receiving, via the I/O ports, real-time static and dynamic data from one or more of. inertial measurement units (IMUs) capable of measuring position, orientation, acceleration, and velocity in at least three dimensions, wheel speed sensors capable of measuring angular speeds of wheels of the motor vehicle, throttle position sensors capable of measuring a throttle position of the motor vehicle, accelerator position sensors capable of measuring a position of an accelerator pedal of the motor vehicle, and tire pressure monitoring sensors capable of measuring pressures of tires of the motor vehicle. The method further includes modeling forces at each tire of the motor vehicle at one or more incremental time steps by generating predictions of longitudinal and lateral forces on each tire of the motor vehicle with a piecewise affine model that calculates a linear approximation of longitudinal forces, lateral forces, self-aligning torques, and coefficients of friction at a contact patch between the tire and a surface such that the linear approximation models tire force behavior in both linear and nonlinear regions at one or more incremental time steps. The method further includes estimating actual forces at each tire of the motor vehicle at each of the one or more incremental time steps with a lookup table that provides estimates actual forces at each tire of the motor vehicle based on the real-time static and dynamic data from the one or more sensors. The method further includes adaptively predicting tire forces at each tire of the motor vehicle at each of the one or more incremental time steps to compensate for effects of tire deformation, tire wear, tire temperature, tire inflation pressure, and a coefficient of friction of a surface in contact with the tire at a contact patch. The method further includes generating one or more control commands for the one or more actuators of the motor vehicle, and capturing discrepancies between real-time force estimations and nominal force calculations at each tire of the motor vehicle, and applying compensation parameters to reduce tracking errors in the one or more control commands to the one or more actuators of the motor vehicle. The compensation parameters include: quantifying tire deformation in terms of longitudinal and lateral slip including a slip angle and a slip ratio. Slip angle and slip ratio are defined respectively by:

$$\alpha_{i,j} = \tan^{-1}\left(\frac{v_{y_{ij}}}{v_{x_{ij}}}\right), \kappa_{i,j} = \frac{(R_e \omega_{i,j} - v_{x_{ij}})}{v_{x_{ij}}}$$

where actual tire forces are mathematically defined by:

$$\min_{c_1,c_2,c_3,c_4,c_5} \sum_i^n (F_z \mu_{x_i} - y_i)^2$$

where $y_i$ represents a force calculation for each of the tires of the motor vehicle, and the coefficients $c_1, c_2, c_3, c_4, c_5$ are based on actual tire forces in different slip angles and different normal forces using nonlinear least squares data; and predicting tire forces based on predicted state variables and the model of forces on each of the tires of the motor vehicle in X and Y directions is defined as:

$$F_{x_{i,j}} = F_{z_{i,j}} \mu^*_{x_{i,j}} \frac{\kappa_{i,j}}{|\kappa_{i,j}|} \min(c_1 \min(c_4|\kappa_{i,j}| + c_5, |\kappa_{i,j}|),$$

$$c_2 \min(c_4|\kappa_{i,j}| + c_5, |\kappa_{i,j}|) + c_3);$$

$$F_{y_{i,j}} = F_{z_{i,j}} \mu^*_{y_{i,j}} \frac{\alpha_{i,j}}{|\alpha_{i,j}|} \min(c_1 \min(c_4|\alpha_{i,j}| + c_5, |\alpha_{i,j}|),$$

$$c_2 \min(c_4|\alpha_{i,j}| + c_5, |\alpha_{i,j}|) + c_3).$$

The tire forces are utilized to calculate state variables such as wheel angular velocities according to the following equation: $J_w \dot{\omega}_{i,j} = T_{i,j} - R_e F_{x_{ij}}$.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
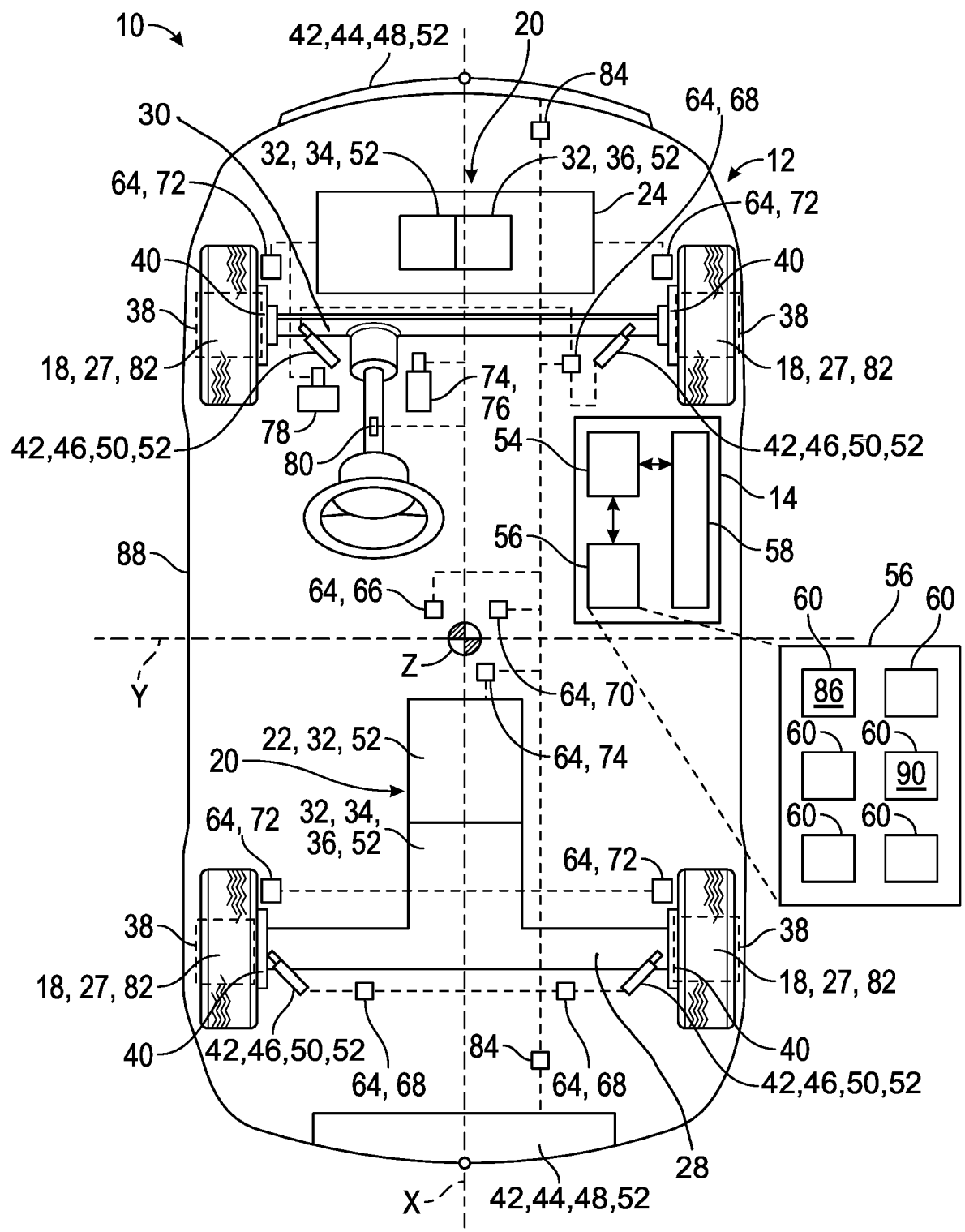
FIG. 1 is a schematic diagram of a motor vehicle having a system for adaptive tire force prediction for integrated motion control in a motor vehicle according to an aspect of the present disclosure.
Figure 2A:
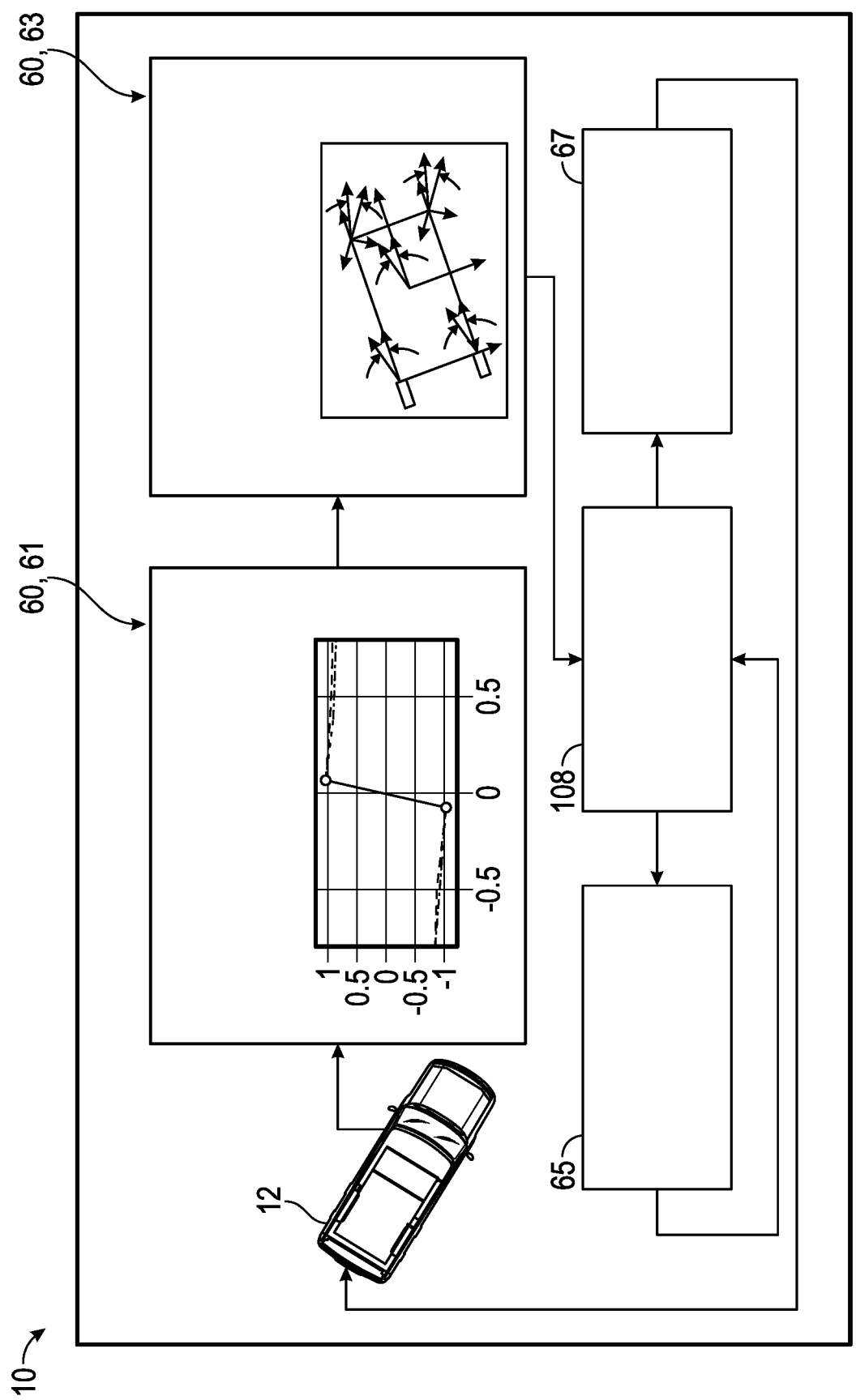
FIG. 2a is a block diagram of the system of adaptive tire force prediction for integrated motion control in a motor vehicle of FIG. 1 according to another aspect of the present disclosure.
Figure 2B:
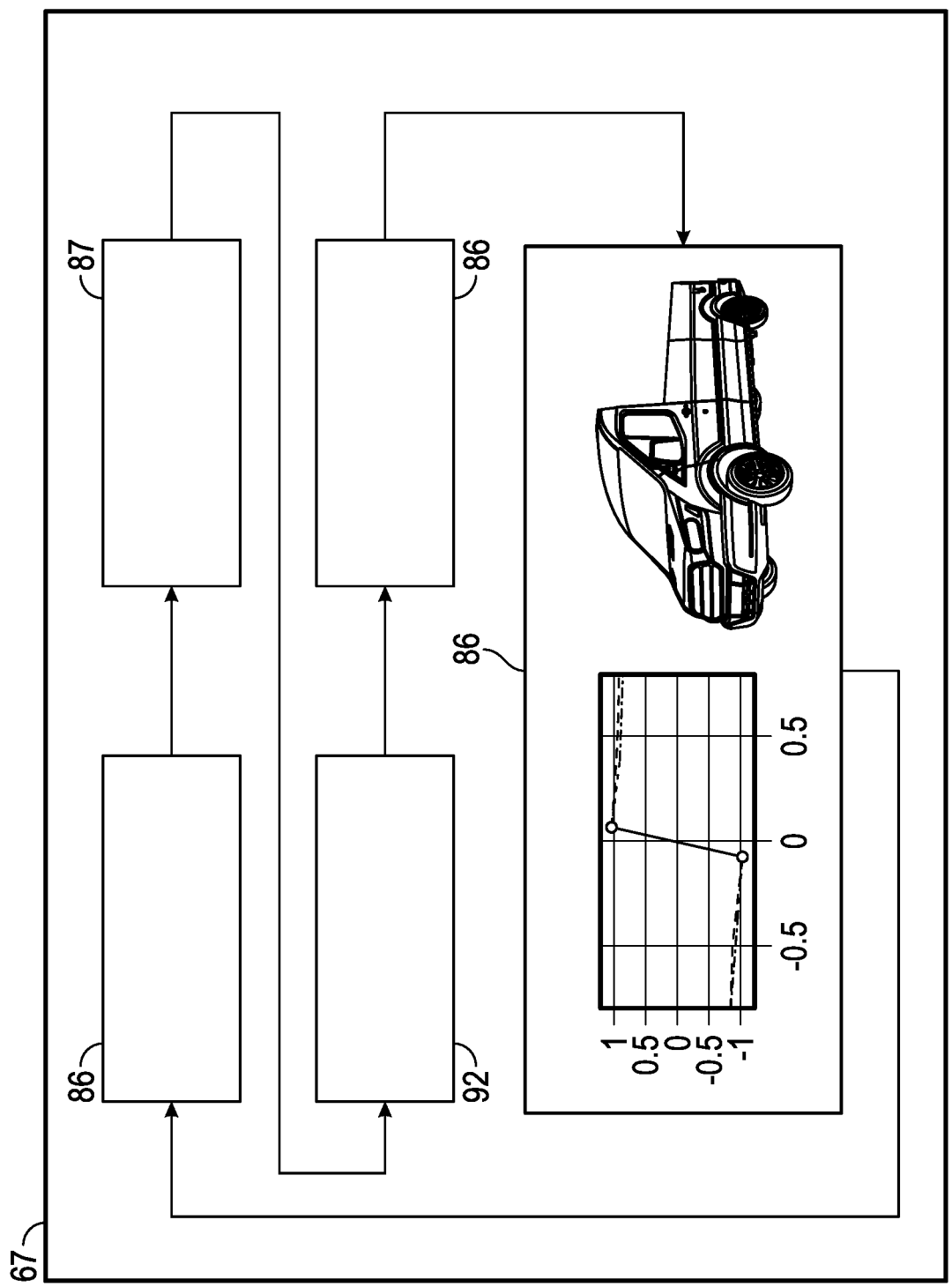
FIG. 2b is a block diagram of a portion of the system for adaptive tire force prediction for integrated motion control in a motor vehicle of FIG. 2a, depicting a real-time computation of forces according to another aspect of the present disclosure.

Referring to FIGS. 1-2b, a system 10 for adaptive tire force prediction in integrated vehicle motion control for a motor vehicle 12 is shown. The system 10 includes the motor vehicle 12 and one or more controllers 14. The motor vehicle 12 is shown as a car, but it should be appreciated that the motor vehicle 12 may be a van, bus, tractor-trailer, semi, SUV, truck, tricycle, motorcycle, airplane, amphibious vehicle, or any other such vehicle which makes contact with the ground without departing from the scope or intent of the present disclosure. The motor vehicle 12 includes one or more wheels having tires 18 and a drivetrain 20. The drivetrain may include a variety of components such as internal combustion engines (ICE) 22 and/or electric motors 24, and transmissions 26 capable of transmitting motive power developed by the ICEs 22 and/or electric motors 24 to the wheels 27, and ultimately to the tires 18 affixed thereto. In one example, the motor vehicle 12 may include an ICE 22 acting on a rear axle 28 of the motor vehicle 12 as well as one or more electric motors 24 acting on a front axle 30 of the motor vehicle 12. It should be appreciated, however, that the motor vehicle 12 may use one or more ICEs 22, and/or one or more electric motors 24 disposed in other configurations without departing from the scope or intent of the present disclosure. For example, the motor vehicle 12 may have an ICE 22 acting only on the front axle 30, while one or more electric motors 24 acts solely on the rear axle 28. In further examples, the ICE 22 may act on both front and rear axles 30, 28, and an electric motor may act on both front and rear axles 30, 28.

In several aspects, the drivetrain 20 includes one or more in-plane actuators 32. In-plane actuators 32 may include all-wheel drive (AWD) systems including electronically-controlled or electric AWD (eAWD) 34 systems as well as limited slip differentials (LSDs) including electronically-controlled or electric LSD (eLSD) 36 systems. In-plane actuators 32 including eAWD 34 and eLSD 36 systems can generate and/or modify force generation in X and/or Y directions at a tire 18 to road surface contact patch 38 within a certain predetermined capacity. An eAWD 34 system may transfer torque from front to rear of a motor vehicle 12 and/or from side-to-side of the motor vehicle 12. Likewise, an eLSD 36 system may transfer torque from side-to-side of the motor vehicle 12. In some examples, the eAWD 34 and/or eLSD 36 may directly alter or manage torque delivery from the ICE 22 and/or electric motors 24 and/or the eAWD 34 and eLSD 36 may act on a braking system 40 to adjust a quantity of torque delivered to each of the tires 18 of the motor vehicle 12.

In further examples, the motor vehicle 12 may include a means of altering a normal force on each of the tires 18 of the motor vehicle 12 via one or more out-of-plane actuators 42 such as active aerodynamic actuators 44 and/or active suspension actuators 46. The active aerodynamic actuators 44 may actively or passively alter an aerodynamic profile of the motor vehicle via one or more active aerodynamic elements 48 such as wings, spoilers, fans or other suction devices, actively-managed Venturi tunnels, and the like. The active suspension actuators 46 such as active dampers 50 or the like. In several aspects, the active dampers 50 may be magnetorheological dampers or other such electrically, hydraulically, or pneumatically-adjustable dampers without departing from the scope or intent of the present disclosure. For the sake of simplicity in the description that follows, ICEs 22, electric motors 24, eAWD 34, eLSD 36, the braking system 40, aerodynamic control system including active aerodynamic elements 48, active dampers 46, and the like will be referred to more broadly as actuators 52.

The terms "forward", "rear", "inner", "inwardly", "outer", "outwardly", "above", and "below" are terms used relative to the orientation of the motor vehicle 12 as shown in the drawings of the present application. Thus, "forward" refers to a direction toward a front of a motor vehicle 12, "rearward" refers to a direction toward a rear of a motor vehicle 12. "Left" refers to a direction towards a left-hand side of the motor vehicle 12 relative to the front of the motor vehicle 12. Similarly, "right" refers to a direction towards a right-hand side of the motor vehicle 12 relative to the front of the motor vehicle 12. "Inner" and "inwardly" refers to a direction towards the interior of a motor vehicle 12, and "outer" and "outwardly" refers to a direction towards the exterior of a motor vehicle 12, "below" refers to a direction towards the bottom of the motor vehicle 12, and "above" refers to a direction towards a top of the motor vehicle 12. Further, the terms "top", "overtop", "bottom", "side" and "above" are terms used relative to the orientation of the actuators 52, and the motor vehicle 12 more broadly shown in the drawings of the present application. Thus, while the orientation of actuators 52, or motor vehicle 12 may change with respect to a given use, these terms are intended to still apply relative to the orientation of the components of the system 10 and motor vehicle 12 components shown in the drawings.

The controllers 14 are non-generalized, electronic control devices having a preprogrammed digital computer or processor 54, non-transitory computer readable medium or memory 56 used to store data such as control logic, software applications, instructions, computer code, data, lookup tables, etc., and input/output (I/O) ports 58. Computer readable medium or memory 56 includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 56 excludes wired, wireless, optical, or other communication links that transport transitory electrical or other signals. A non-transitory computer readable memory 56 includes media where data can be permanently stored and media where data can be stored and later overwritten, such as a rewritable optical disc or an erasable memory device. Computer code includes any type of program code, including source code, object code, and executable code. The processor 54 is configured to execute the code or instructions. The motor vehicle 12 may have controllers 14 including a dedicated Wi-Fi controller or an engine control module, a transmission control module, a body control module, an infotainment control module, etc. The I/O ports 58 may be configured to communicate via wired communications, wirelessly via Wi-Fi protocols under IEEE 802.11x, or the like without departing from the scope or intent of the present disclosure.

The controller 14 further includes one or more applications 60. An application 60 is a software program configured to perform a specific function or set of functions. The application 60 may include one or more computer programs, software components, sets of instructions, procedures, functions, objects, classes, instances, related data, or a portion thereof adapted for implementation in a suitable computer readable program code. The applications 60 may be stored within the memory 56 or in additional or separate memory. Examples of the applications 60 include audio or video streaming services, games, browsers, social media, etc. In other examples, the applications 60 are used to manage body control system functions, suspension control system functions, aerodynamic control system functions, or the like in an exemplary motor vehicle 12.

In several aspects, to manage tire 18 performance the system 10 makes use of one or more applications 60 for modeling the tires 18. In an example, the applications 60 include an offline adaptation algorithm 61 and an online adaptation algorithm 63. The offline adaptation algorithm 61 models tire 18 parameters and compensates based on tire 18 slip effects and actual tire 18 grip capacity. By contrast, the online adaptation algorithm 63 models tire 18 parameters and compensates based on tire 18 wear, tire 18 pressure, tire 18 temperature, road surface or contact patch 38 coefficients of friction, and the like. In several aspects, the applications 60 may be model predictive control (MPC) algorithms 62 or the like, or other known techniques used to model and predict motor vehicle 12 behavior over a short term horizon. In some examples, the short-term prediction horizon is 10-15 sample times, or approximately 100-150 milliseconds, however the precise number of sample times and/or time defining the prediction horizon may differ from the above-recited values without departing from the scope or intent of the present disclosure. In the MPC algorithm 62, the system 10 operates primarily in a feedback control model to adjust a real-time constraint to optimize tire 18 capacity and actuator 52 capacity for maintaining motor vehicle 12 stability, yaw rate, lateral velocity, and the like. That is, the controller 14 combines the offline adaptation algorithm 61, online adaptation algorithm 63 and the motor vehicle state information in a hybridized tire force calculation 65 that can be used to generate a real time optimization 67 that that maximizes tire 18 capacity and actuator 52 capacity for maintaining motor vehicle 12 performance in a wide variety of driving conditions.

The controller 14 receives data from a variety of sensors 64 equipped to the motor vehicle 12 and obtaining vehicle state information. The sensors 64 may measure and record a wide variety of motor vehicle 12 data. In several examples, the sensors 64 may include inertial measurement units (IMUs) 66, suspension control units such as Semi Active Damping Suspension (SADS) 68, global positioning system (GPS) sensors 70, wheel speed sensors 72, throttle position sensors 74, accelerator pedal position sensors 76, brake pedal position sensors 78, steering position sensors 80, tire pressure monitoring sensors 82, aerodynamic element position sensors 84.

A piecewise affine tire model 86 defines another of the applications 60 stored in memory 56. The piecewise affine tire model 86 obtains longitudinal and lateral forces at each tire 18 at each time step of the prediction horizon. The piecewise affine tire model 86 is adaptive and takes into account the impact of variation of normal forces and tire deformation in real-time. In an example, as the motor vehicle 12 traverses a road or off-road surface, the tires 18 may encounter a variety of surface perturbations present in the road or off-road surface. The surface perturbations may be potholes, pavement discontinuities, road camber and/or crown, rocks, dirt, standing water, oil, or any of a wide variety of other changes in surface coefficient of friction and/or shape. As the tires 18 encounter the perturbations, and due to the elasticity built into each tire 18, and the suspension system components to which the wheels and tires 18 are attached, the tires 18 may deflect from a given path of travel on the surface in one or more of the X, Y, and Z directions. Likewise, the elasticity of tires 18 may cause deformations from a round shape when a surface perturbation is encountered. Actual forces on each of the tires 18 are obtained through online estimations at the beginning of each of the prediction horizons. Predictive tire 18 forces are then calculated using an adaptive tire model that relies on nominal known tire parameters and a potential compensation to match force with real-time estimations in different driving conditions.

In several aspects, the piecewise affine tire model 86 is a linear approximation of a so-called "magic formula" (MF) based tire model. The MF tire model fits a wide variety of tire 18 types, constructions, and operating conditions. In the MF tire model, each tire 18 is characterized by a plurality of coefficients for each force relevant to tire 18 performance. In some examples, the plurality of coefficients relate to contact patch, lateral and longitudinal forces, self-aligning torque, and the like. These coefficients are used as a best-fit between experimentally-determined tire 18 performance data and the MF model. The coefficients then may be used to generate equations showing how much force is generated for a particular vertical load on the tire 18, as well as camber angle, slip angle $\alpha_{i,j}$, and the like. An original formula for longitudinal forces in the MF tire model may be presented as follows:

$$F_x = (D_x \sin[C_x \tan^{-1}\{B_x \kappa_x - E_x(B_x \kappa_x - \tan^{-1}(B_x \kappa_x))\}] + S_{Vx})G_{xa}$$

$$\kappa_x = \kappa + S_{Hx}$$

$$C_x = p_{Cx1}\lambda_{Cx}$$

$$D_x = \mu_x F_z \xi_1$$

$$\mu_x = (p_{Dx1} + p_{Dx2}df_z)(1 + p_{px3}dpi + p_{px4}dpi^2)(1 - p_{Dx3}\gamma^2)\lambda_{\mu_x}$$

$$E_x = (p_{Ex1} + p_{Ex2}df_z + p_{Ex3}df_z^2)(1 - p_{Ex4}\text{sgn}(\kappa_x))\lambda_{E_x}$$

$$K_{xx} = F_z(p_{Kx1} + p_{Kx2}df_z)e^{p_{Kx3}df_z}(1 + p_{px1}dpi + p_{px2}dpi^2)\lambda_{K_{xx}}$$

$$B_x = \frac{K_{xx}}{C_x D_x}$$

$$S_{Hx} = (p_{Hx1} + p_{Hx2}df_z)\lambda_{H_x}$$

$$S_{Vx} = F_z(p_{Vx1} + p_{Vx2}df_z)\lambda_{V_x}\lambda_{\mu_x}\xi_1$$

where for combined slip in both longitudinal and lateral directions, the parameter $G_{xa}$ can be calculated as:

$$G_{xa} = \frac{\cos[C_{xa}\tan^{-1}\{B_{xa}\alpha_s - E_{xa}(B_{xa}\alpha_s - \tan^{-1}(B_{xa}\alpha_s))\}]}{\cos[C_{xa}\tan^{-1}\{B_{xa}S_{Hxa} - E_{xa}(B_{xa}S_{Hxa} - \tan^{-1}(B_{xa}S_{Hxa}))\}]}$$

$$\alpha_s = \alpha_F + S_{Hxa}$$

$$B_{xa} = (r_{Bx1} + r_{Bx3}\gamma^2)\cos\{\tan^{-1}[r_{Bx2}\kappa]\}\lambda_{x_a}$$

$$C_{xa} = r_{Cx1}$$

$$E_{xa} = r_{Ex1} + r_{Ex2}df_z$$

$$S_{Hxa} = r_{Hx1}$$

However, when combined slip in longitudinal and lateral directions is not used, $G_{xa}=1$. Likewise, when turning-slip is not used in the formulae above, $\xi_1=1$.

In order to calculate derivatives of the longitudinal forces on each tire 18 in an analytical fashion, and to reduce computational time, effort, and resource utilization, the piecewise affine linear approximation is utilized as:

$$\mu_x = \frac{\kappa}{|\kappa|}\min(c_1\min(c_4|\kappa| + c_5, |\kappa|), c_2\min(c_4|\kappa| + c_5, |\kappa|) + c_3)$$

where, the tire parameters are found such that linear approximation provides an accurate tire force behavior both in linear and nonlinear regions.

Tire 18 deformation can be quantified in terms of longitudinal and lateral slip 87. To calculate longitudinal and lateral slip 87, first longitudinal and lateral velocities coordinates relating to a body 88 of the motor vehicle 12 are calculated according to the equations below.

$$V_{x_{FL}} = V_x - rLwf \quad V_{y_{FL}} = V_y + rLf$$

$$V_{x_{FR}} = V_x + rLwf \quad V_{y_{FR}} = V_y + rLf$$

$$V_{x_{RL}} = V_x - rLwr \quad V_{y_{RL}} = V_y - rLr$$

$$V_{x_{RR}} = V_x + rLwr \quad V_{y_{RR}} = V_y - rLr$$

Where $V_{xFL}$ and $V_{yFL}$ define a velocity of the tire 18 at a front left of the motor vehicle 12 in X and Y directions, respectively. Likewise, $V_{xFR}$ and $V_{yFR}$ define a velocity of the tire 18 at a front right of the motor vehicle 12 in X and Y directions, respectively. Similarly, $V_{xRL}$ and $V_{yRL}$ and $V_{xRR}$ and $V_{yRR}$ define velocities of the tires 18 at the left rear and right rear of the motor vehicle 12 in X and Y directions, respectively. A rotation matrix may be used to transfer velocities into wheel coordinates:

$$\phi_{ij} = \begin{bmatrix} \cos(\theta_{f,r}) & \sin(\theta_{f,r}) \\ -\sin(\theta_{f,r}) & \cos(\theta_{f,r}) \end{bmatrix}, v_{x,y_{i,j}} = \phi_{ij} \begin{bmatrix} V_{x_{i,j}} \\ V_{y_{i,j}} \end{bmatrix}.$$

Then, slip angle and slip ratio can be calculated as:

$$\alpha_{i,j} = \tan^{-1}\left(\frac{v_{y_{ij}}}{v_{x_{ij}}}\right), \kappa_{i,j} = \frac{(R_e \omega_{i,j} - v_{x_{ij}})}{v_{x_{ij}}}.$$

As side slip angle $\alpha_{i,j}$ is only a function of motor vehicle 12 lateral and longitudinal speeds at each tire 18 and only dependent on body 88 states, rather than states of the wheels and tires 18 themselves, during a short-duration prediction horizon, the side slip angle $\alpha_{i,j}$ is unlikely to change dramatically. Therefore, the side slip angle $\alpha_{i,j}$ may be, for the purposes of certain calculations, assumed to be constant for the length of a short-duration prediction horizon.

The piecewise affine tire model 86 further includes a tire curve fitting process 90. The tire curve fitting process 90 is a computer executable program code portion or algorithm that matches forces at each tire 18 and calculated from the MF tire model to the simplified piecewise affine tire model 86 for different slip angles $\alpha_{i,j}$ and normal forces. The result of the above analysis is the plurality of coefficients describing the various forces on each tire 18. More specifically, the coefficients obtained are based on the actual forces on each tire 18 in different slip angles $\alpha_{i,j}$ and normal forces using a nonlinear least squares data fitting method mathematically defined by the formula below:

$$\min_{c_1,c_2,c_3,c_4,c_5} \sum_i^n (F_z \mu_{x_i} - y_i)^2$$

where $y_i$ represents the MF force calculation. Once the coefficients $c_1$, $c_2$, $c_3$, $c_4$, $c_5$ are obtained for different slip angles and normal forces, a lookup table 92 is designed which provides the coefficients $c_1$, $c_2$, $c_3$, $c_4$, $c_5$ for a certain range of slip angles $\alpha_{i,j}$ and normal forces to be used in the piecewise affine tire model 86.

To calculate nominal forces on each tire 18, the system 10 estimates and/or predicts the state variables of the motor vehicle 12. Then, longitudinal and lateral slip 87 information of the tires 18 of the motor vehicle 12 are calculated. More specifically, slip ratios and slip angles $\alpha_{i,j}$ are calculated based on available estimates at the beginning of the prediction horizon. Then, the lookup table that contains tire 18 curve information is utilized to calculate forces on each tire 18 and to predict body 88 and wheel 27 state variables within the piecewise affine prediction model 86. Predicted state variables are used in the context of sampling time to calculate updated predicted slip ratios and slip angles $\alpha_{i,j}$ and then, to calculate new forces on each tire 18. The system 10 continuously and recursively updates the estimates and/or predictions of the state variables throughout while the motor vehicle 12 is being driven. Accordingly, the system 10 generates real-time computations of longitudinal and lateral forces on the tires 18 of the motor vehicle 12.

Figure 3:
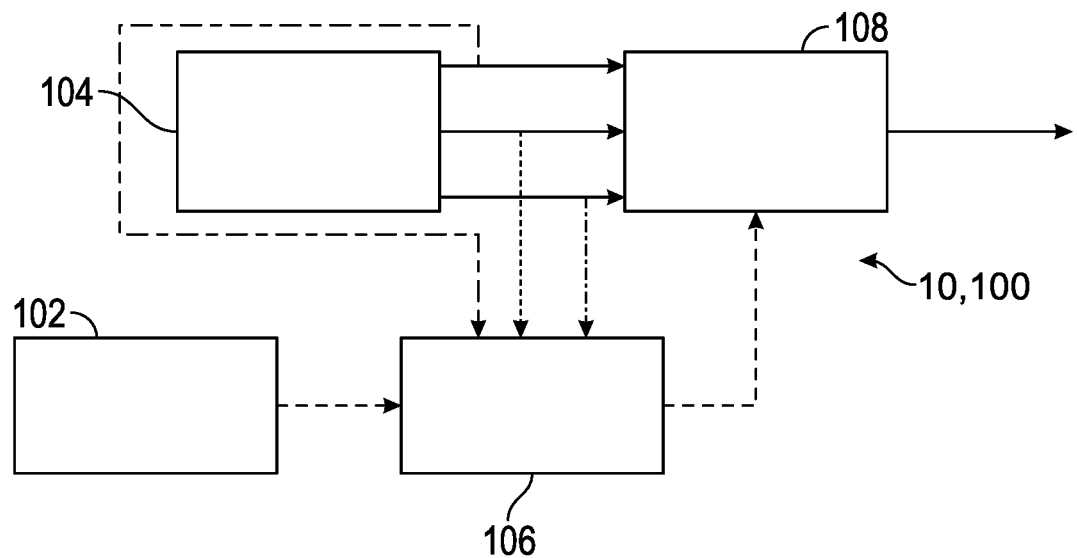
FIG. 3 is a partial functional block diagram of a portion of the system for adaptive tire force prediction for integrated motion control in a motor vehicle according to an aspect of the present disclosure.

Turning now to FIG. 3, and with continuing reference to FIGS. 1-2b, to provide a robust tire 18 force prediction and achieve optimal control performance in different road and environmental conditions, both controlled and uncontrolled, a compensator algorithm 100 captures discrepancies between real-time force estimation and nominal tire 18 force calculations. In broad terms, a formulation of the compensator algorithm 100 may be presented as follows:

$$F_{x,\text{tire model}} = \hat{F}_{x,\text{estimated}}$$

$$F_{y,\text{tire model}} = \hat{F}_{y,\text{estimated}}$$

where, $$F_{x,\text{tire model}} = F_z \mu_x \mu_x^*$$

$$F_{y,\text{tire model}} = F_z \mu_y \mu_y^*$$

In fact, $\mu_x^*$ and $\mu_y^*$ are compensation parameters that match real-time force estimation with tire 18 model calculations to be robust against road surface, tire 18 temperature and pressure changes, and the like. Real time estimations are provided to the compensator algorithm 100 through the controller 14. More specifically, in some aspects, the controller 14 is a vehicle dynamic controller (VDC) 102 or control module. The VDC 102 provides the compensator algorithm 100 with estimations of lateral and longitudinal forces on each tire 18. The compensator algorithm 100 also receives state estimations from an extended Kalman filter (EKF) 104. In several aspects, the EKF 104 is an optimal estimation algorithm that estimates states of the system 10 from indirect and/or uncertain measurements. A compensation calculator 106 determines compensation parameters $\mu_x^*$ and $\mu_y^*$ from the outputs from EKF 104 and the VDC 102. The compensation parameters $\mu_x^*$ and $\mu_y^*$ are then fed into a linear time-varying (LTV) MPC 108 to match real-time force estimation with tire 18 model calculations during the prediction horizon.

Forces on each tire 18 may then be predicted based on predicted state variables and the tire models as shown in the modified MF equations below:

$$F_{x_{i,j}} = F_{z_{i,j}} \mu_{x_{i,j}}^* \frac{\kappa_{i,j}}{|\kappa_{i,j}|} \min(c_1 \min(c_4|\kappa_{i,j}| + c_5, |\kappa_{i,j}|), c_2 \min(c_4|\kappa_{i,j}| + c_5, |\kappa_{i,j}|) + c_3)$$

$$F_{y_{i,j}} = F_{z_{i,j}} \mu_{y_{i,j}}^* \frac{\alpha_{i,j}}{|\alpha_{i,j}|} \min(c_1 \min(c_4|\alpha_{i,j}| + c_5, |\alpha_{i,j}|), c_2 \min(c_4|\alpha_{i,j}| + c_5, |\alpha_{i,j}|) + c_3)$$

Likewise, tire 18 forces can be utilized to calculate state variables such as wheel angular velocities:

$$J_w \dot{\omega}_{i,j} = T_{i,j} - R_e F_{x_{i,j}}$$

Moreover, body 88 state variables can be calculated with a similar approach.

The compensation parameters $\mu_x^*$ and $\mu_y^*$ may be estimated using several different methods. In one example, a Least Square Method (LSM) is used for real-time estimation of the compensation parameters to capture discrepancies between real-time force estimation and nominal tire 18 force calculations. However, it should be appreciated that the LSM may be replaced with any optimization method capable of finding the compensation parameters with minimum possible error without departing from the scope or intent of the present disclosure. In an example, given data $\{(x_1, y_1) \ldots (x_n, y_n)\}$, the error associated with y=ax+b is defined as $E(a, b) = \sum_{n=1}^{n} (y_n - (ax_n + b))^2$. The goal then, is to find values of a and b such that they minimize the error E(a,b). In order to accomplish this goal, a and b are calculated such that $$\frac{\partial E}{\partial a} = 0, \text{ and } \frac{\partial E}{\partial b} = 0.$$

The analytical solution for the minimum possible values of a and b via the LSM estimate is, then:

$$\begin{pmatrix} a \\ b \end{pmatrix} = \begin{pmatrix} \sum_{n=1}^{N} x_n^2 & \sum_{n=1}^{N} x_n \\ \sum_{n=1}^{N} x_n & \sum_{n=1}^{N} 1 \end{pmatrix}^{-1} \begin{pmatrix} \sum_{n=1}^{N} x_n y_n \\ \sum_{n=1}^{N} y_n \end{pmatrix}$$

Figure 4:
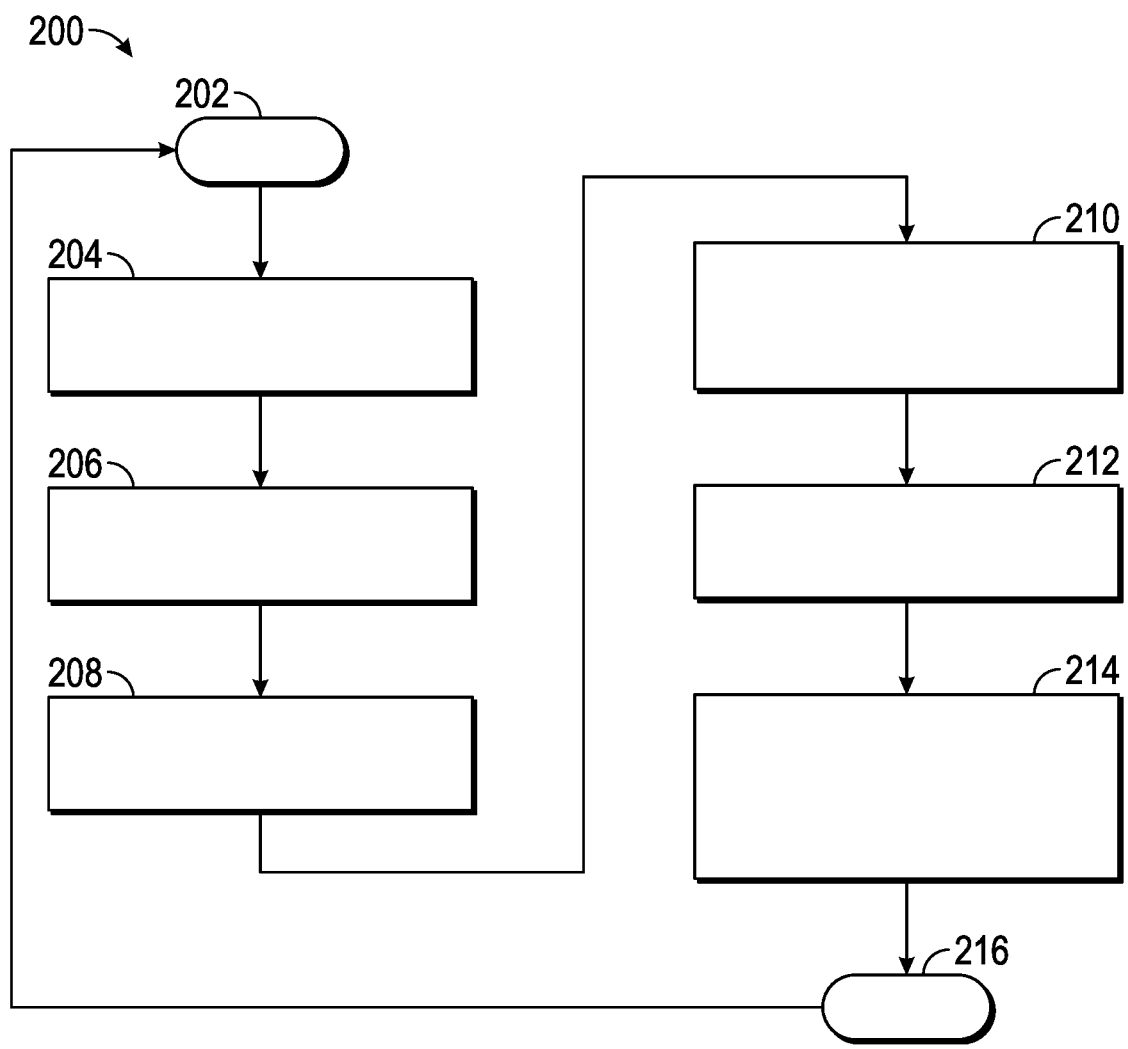
FIG. 4 is a flowchart depicting a method for adaptive tire force prediction for integrated motion control in a motor vehicle according to an aspect of the present disclosure.

Referring now to FIG. 4, and with continuing reference to FIGS. 1-3, a method 200 of adaptive tire force prediction for integrated vehicle motion control is shown in flowchart form. The method 200 begins at block 202 where the one or more sensors 64 equipped to the motor vehicle 12 continuously in real-time measure vehicle state information including static and dynamic motor vehicle 12 state data. At block 204, the controller 14 executes a first program code portion to receives the vehicle state information from the sensors.

At block 206, the controller 14 executes a second program code portion that uses a piecewise affine model 86 to determine forces at each tire 18 of the motor vehicle 12 at one or more incremental time steps. More specifically, the piecewise affine tire model 86 is a linear approximation of a so-called "magic formula" (MF) based tire model. In the MF tire model, each tire 18 is characterized by a plurality of coefficients for each force relevant to tire 18 performance. In some examples, the plurality of coefficients relate to contact patch, lateral and longitudinal forces, self-aligning torque, and the like. These coefficients are used as a best-fit between experimentally-determined tire 18 performance data and the MF model. The coefficients then may be used to generate equations showing how much force is generated for a particular vertical load on the tire 18, as well as camber angle, slip angle $\alpha_{i,j}$, and the like.

In several aspects, the piecewise affine linear approximation is utilized as:

$$\mu_x = \frac{\kappa}{|\kappa|} \min(c_1 \min(c_4|\kappa| + c_5, |\kappa|), c_2 \min(c_4|\kappa| + c_5, |\kappa|) + c_3)$$

where, the tire parameters are found such that linear approximation provides an accurate tire force behavior both in linear and nonlinear regions At block 208, the controller executes a third program code portion that estimates actual forces on each tire 18 of the motor vehicle 12 at each of the one or more incremental time steps. More specifically the system 10 estimates and/or predicts the state variables of the motor vehicle 12. Then, longitudinal and lateral slip 87 information of the tires 18 of the motor vehicle 12 are calculated. Slip ratios and slip angles $\alpha_{i,j}$ are calculated based on available estimates at the beginning of the prediction horizon. Then, the lookup table that contains tire 18 curve information is utilized to calculate forces on each tire 18 and to predict body 88 and wheel 27 state variables within the piecewise affine prediction model 86. Predicted state variables are used in the context of sampling time to calculate updated predicted slip ratios and slip angles $\alpha_{i,j}$ and then, to calculate new forces on each tire 18. The system 10 continuously and recursively updates the estimates and/or predictions of the state variables throughout while the motor vehicle 12 is being driven. Accordingly, the system 10 generates real-time computations of longitudinal and lateral forces on the tires 18 of the motor vehicle 12.

At block 210, the controller 14 executes a fourth program code portion that adaptively predicts forces at each tire 18 of the motor vehicle 12 at each of the one or more incremental time steps. More specifically, the fourth program code portion adapts to tire 18 parameters that may change over the lifespan of a given tire 18. For example, the fourth program code portion compensates for the effects of tire 18 wear, tire 18 temperature, tire 18 inflation pressure, a coefficient of friction of a surface in contact with the tire 18, and so forth.

At block 212, the controller 14 executes a fifth program code portion generates one or more control commands for the one or more actuators 52 of the motor vehicle 12. The control commands may include a torque request, a steering input, or the like. At block 214, the controller 14 executes a sixth program code portion that captures discrepancies between real-time force estimations and nominal force calculations at each tire 18 of the motor vehicle 12. The sixth program code portion also applies compensation parameters to reduce tracking errors in the one or more control commands to the one or more actuators 52 of the motor vehicle 12 so that adhesion between the tire 18 and road surface at the contact patch 38 is maximized for the motor vehicle 12 in any given dynamic or complex driving situation.

At block 216, the method ends and returns to block 202 where the method 200 runs again iteratively, continuously, and/or recursively while the motor vehicle 12 is being driven.

The system 10 and method 200 of adaptive tire force prediction for integrated vehicle motion control of the present disclosure offer several advantages. These include providing a motor vehicle 12 driver or operator maximum feasible performance, stability, handling, maneuverability, steerability of the motor vehicle 12 in a wide variety of conditions, including in inclement weather, instances of tire 18 deformation, tire 18 wear, tire 18 temperature variations, tire 18 inflation levels, and the like. Additionally, the system 10 and method 200 may operate on a motor vehicle 12 in complex driving scenarios, including performance driving situations in which the driver may attempt a powerslide, drift, or the like, and the system 10 and method 200 will operate to provide an appropriate quantity of force generation at the tire 18/road interface or contact patch 38, while also providing maximum tire 18/road interface or contact patch 38 adhesion in driving scenarios in which maximum grip is desired. These benefits may all be obtained using the system 10 and method 200 described herein while maintaining or reducing cost and complexity, reducing calibration efforts, and improving simplicity, and while also providing increased redundancy and robustness.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for adaptive tire force prediction in a motor vehicle, the system comprising:
   one or more sensors disposed on the motor vehicle, the one or more sensors measuring real-time static and dynamic data about the motor vehicle;
   one or more actuators disposed on the motor vehicle, the one or more of actuators altering static and dynamic behavior of the motor vehicle;
   a control module having a processor, a memory, and input/output (I/O) ports, the control module executing program code portions stored in the memory, the program code portions comprising:
   a first program code portion that receives, via the I/O ports, the real-time static and dynamic data from the one or more sensors;
   a second program code portion that models forces at each tire of the motor vehicle at one or more incremental time steps;
   a third program code portion that estimates actual forces at each tire of the motor vehicle at each of the one or more incremental time steps;
   a fourth program code portion that adaptively predicts tire forces at each tire of the motor vehicle at each of the one or more incremental time steps, wherein a slip angle and a slip ratio are defined respectively by:

$$\alpha_{i,j} = \tan^{-1}\left(\frac{v_{y_{ij}}}{v_{x_{ij}}}\right), \kappa_{i,j} = \frac{(R_e\omega_{i,j} - v_{x_{ij}})}{v_{x_{ij}}}$$

wherein actual tire forces are mathematically defined by:

$$\min_{c_1, c_2, c_3, c_4, c_5} \sum_i^n (F_z\mu_{x_i} - y_i)^2$$

where $y_i$ represents a force calculation for each of the tires of the motor vehicle, and wherein coefficients $c_1$, $c_2$, $c_3$, $c_4$, $c_5$ are based on actual tire forces in different slip angles and different normal forces using nonlinear least squares data;
   a fifth program code portion that generates one or more control commands for the one or more actuators of the motor vehicle; and
   a sixth code portion that captures discrepancies between real-time force estimations and nominal force calculations at each tire of the motor vehicle, and applies compensation parameters to reduce tracking errors in the one or more control commands to the one or more actuators of the motor vehicle.

2. The system for adaptive tire force prediction in a motor vehicle of claim 1, wherein the first program code portion further comprises:
   receiving real-time static and dynamic data from one or more of:
   inertial measurement units (IMUs) capable of measuring position, orientation, acceleration, and velocity in at least three dimensions;
   wheel speed sensors capable of measuring angular speeds of wheels of the motor vehicle;
   throttle position sensors capable of measuring a throttle position of the motor vehicle;
   accelerator position sensors capable of measuring a position of an accelerator pedal of the motor vehicle; and
   tire pressure monitoring sensors capable of measuring pressures of tires of the motor vehicle.

3. The system for adaptive tire force prediction in a motor vehicle of claim 2, wherein the real-time static and dynamic data further comprises:
   lateral velocity;
   longitudinal velocity;
   yaw rate;
   wheel angular velocity; and
   longitudinal, lateral, and normal forces on each tire of the motor vehicle.

4. The system for adaptive tire force prediction in a motor vehicle of claim 1, wherein the second program code portion further comprises:
   a piecewise affine model that generates predictions of longitudinal and lateral forces on each tire of the motor vehicle.

5. The system for adaptive tire force prediction in a motor vehicle of claim 4, wherein the piecewise affine model further comprises:
   a program code portion that calculates a linear approximation of longitudinal forces, lateral forces, self-aligning torques, and coefficients of friction at a contact patch between the tire and a surface such that the linear approximation models tire force behavior in both linear and nonlinear regions at one or more incremental time steps.

6. The system for adaptive tire force prediction in a motor vehicle of claim 1, wherein the third program code portion further comprises utilizing a lookup table to estimate actual forces at each tire of the motor vehicle based on the real-time static and dynamic data from the one or more sensors.

7. The system for adaptive tire force prediction in a motor vehicle of claim 1, wherein the fourth program code portion adaptively predicts tire forces at each tire of the motor vehicle at each of the one or more incremental time steps to compensate for effects of tire deformation, tire wear, tire temperature, tire inflation pressure, and a coefficient of friction of a surface in contact with the tire at a contact patch.

8. The system for adaptive tire force prediction in a motor vehicle of claim 7, wherein tire deformation is quantified in terms of longitudinal and lateral slip including the slip angle and the slip ratio.

9. The system for adaptive tire force prediction in a motor vehicle of claim 8, wherein the tire forces are predicted based on predicted state variables and the model of forces on each of the tires of the motor vehicle in X and Y directions is defined as:

$$F_{x_{i,j}} = F_{z_{i,j}}\mu^*_{x_{i,j}}\frac{\kappa_{i,j}}{|\kappa_{i,j}|}\min(c_1\min(c_4|\kappa_{i,j}| + c_5, |\kappa_{i,j}|), c_2\min(c_4|\kappa_{i,j}| + c_5, |\kappa_{i,j}|) + c_3);$$

$$F_{y_{i,j}} = F_{z_{i,j}}\mu^*_{y_{i,j}}\frac{\alpha_{i,j}}{|\alpha_{i,j}|}\min(c_1\min(c_4|\alpha_{i,j}| + c_5, |\alpha_{i,j}|), c_2\min(c_4|\alpha_{i,j}| + c_5, |\alpha_{i,j}|) + c_3);$$

and
   wherein the tire forces are utilized to calculate state variables such as wheel angular velocities according as $J_w\dot{\omega}_{i,j} = T_{i,j} - R_e F_{x_{i,j}}$.

10. A method for adaptive tire force prediction in a motor vehicle, the method comprising:
  processing static and dynamic motor vehicle information through a control module, the control module having a processor, a memory, and input/output (I/O) ports, the control module executing program code portions stored in the memory, the program code portions:
  measuring real-time static and dynamic data with one or more sensors disposed on the motor vehicle;
  utilizing one or more actuators disposed on the motor vehicle to alter static and dynamic behavior of the motor vehicle;
  receiving, via the I/O ports, the real-time static and dynamic data from the one or more sensors;
  modeling forces at each tire of the motor vehicle at one or more incremental time steps;
  estimating actual forces at each tire of the motor vehicle at each of the one or more incremental time steps;
  adaptively predicting tire forces at each tire of the motor vehicle at each of the one or more incremental time steps, based on predicted state variables and the model of forces on each of the tires of the motor vehicle in X and Y directions as defined as:

$$F_{x_{i,j}} =$$
$$F_{z_{i,j}} \mu^*_{x_{i,j}} \frac{\kappa_{i,j}}{|\kappa_{i,j}|} \min(c_1 \min(c_4|\kappa_{i,j}|+c_5, |\kappa_{i,j}|), c_2\min(c_4|\kappa_{i,j}|+c_5, |\kappa_{i,j}|)+c_3);$$
$$F_{y_{i,j}} =$$
$$F_{z_{i,j}} \mu^*_{y_{i,j}} \frac{\alpha_{i,j}}{|\alpha_{i,j}|} \min(c_1 \min(c_4|\alpha_{i,j}|+c_5, |\alpha_{i,j}|), c_2\min(c_4|\alpha_{i,j}|+c_5, |\alpha_{i,j}|)+c_3);$$

and wherein the tire forces are utilized to calculate state variables such as wheel angular velocities according to the following equation: $J_w \dot{\omega}_{i,j} = T_{i,j} - R_e F_{x_{i,j}}$;
  generating one or more control commands for the one or more actuators of the motor vehicle; and
  capturing discrepancies between real-time force estimations and nominal force calculations at each tire of the motor vehicle, and applying compensation parameters to reduce tracking errors in the one or more control commands to the one or more actuators of the motor vehicle.

11. The method for adaptive tire force prediction in a motor vehicle of claim 10, further comprising:
  receiving real-time static and dynamic data from one or more of:
  inertial measurement units (IMUs) capable of measuring position, orientation, acceleration, and velocity in at least three dimensions;
  wheel speed sensors capable of measuring angular speeds of wheels of the motor vehicle;
  throttle position sensors capable of measuring a throttle position of the motor vehicle;
  accelerator position sensors capable of measuring a position of an accelerator pedal of the motor vehicle; and
  tire pressure monitoring sensors capable of measuring pressures of tires of the motor vehicle.

12. The method for adaptive tire force prediction in a motor vehicle of claim 11, wherein measuring real-time static and dynamic data further comprises measuring:
  lateral velocity;
  longitudinal velocity;
  yaw rate;
  wheel angular velocity; and
  longitudinal, lateral, and normal forces on each tire of the motor vehicle.

13. The method for adaptive tire force prediction in a motor vehicle of claim 10, further comprising:
  generating predictions of longitudinal and lateral forces on each tire of the motor vehicle with a piecewise affine model.

14. The method for adaptive tire force prediction in a motor vehicle of claim 13, wherein generating predictions of longitudinal and lateral forces on each tire of the motor vehicle with a piecewise affine model further comprises:
  calculating a linear approximation of longitudinal forces, lateral forces, self-aligning torques, and coefficients of friction at a contact patch between the tire and a surface such that the linear approximation models tire force behavior in both linear and nonlinear regions at one or more incremental time steps.

15. The method for adaptive tire force prediction in a motor vehicle of claim 10, further comprising:
  utilizing a lookup table to estimate actual forces at each tire of the motor vehicle based on the real-time static and dynamic data from the one or more sensors.

16. The method for adaptive tire force prediction in a motor vehicle of claim 10, further comprising:
  adaptively predicting tire forces at each tire of the motor vehicle at each of the one or more incremental time steps to compensate for effects of tire deformation, tire wear, tire temperature, tire inflation pressure, and a coefficient of friction of a surface in contact with the tire at a contact patch.

17. The method for adaptive tire force prediction in a motor vehicle of claim 16, further comprising:
  quantifying tire deformation in terms of longitudinal and lateral slip including a slip angle and a slip ratio, wherein slip angle and slip ratio are defined respectively by:

$$\alpha_{i,j} = \tan^{-1}\left(\frac{v_{y_{ij}}}{v_{x_{ij}}}\right), \kappa_{i,j} = \frac{(R_e \omega_{i,j} - v_{x_{ij}})}{v_{x_{ij}}}$$

wherein actual tire forces are mathematically defined by:

$$\min_{c_1, c_2, c_3, c_4, c_5} \sum_i^n (F_z \mu_{x_i} - y_i)^2$$

where $y_i$ represents a force calculation for each of the tires of the motor vehicle, and wherein coefficients $c_1$, $c_2$, $c_3$, $c_4$, $c_5$ are based on actual tire forces in different slip angles and different normal forces using nonlinear least squares data.

18. A method for adaptive tire force prediction in a motor vehicle, the method comprising:
  processing static and dynamic motor vehicle information through a control module, the control module having a processor, a memory, and input/output (I/O) ports, the control module executing program code portions stored in the memory, the program code portions:
  measuring real-time static and dynamic data with one or more sensors disposed on the motor vehicle, the real-time static and dynamic data including:

utilizing one or more actuators disposed on the motor vehicle to alter static and dynamic behavior of the motor vehicle;
receiving, via the I/O ports, real-time static and dynamic data from one or more of:
  inertial measurement units (IMUs) capable of measuring position, orientation, acceleration, and velocity in at least three dimensions;
  wheel speed sensors capable of measuring angular speeds of wheels of the motor vehicle;
  throttle position sensors capable of measuring a throttle position of the motor vehicle;
  accelerator position sensors capable of measuring a position of an accelerator pedal of the motor vehicle; and
  tire pressure monitoring sensors capable of measuring pressures of tires of the motor vehicle;
modeling forces at each tire of the motor vehicle at one or more incremental time steps by generating predictions of longitudinal and lateral forces on each tire of the motor vehicle with a piecewise affine model that calculates a linear approximation of longitudinal forces, lateral forces, self-aligning torques, and coefficients of friction at a contact patch between the tire and a surface such that the linear approximation models tire force behavior in both linear and nonlinear regions at one or more incremental time steps;
estimating actual forces at each tire of the motor vehicle at each of the one or more incremental time steps with a lookup table that provides estimates actual forces at each tire of the motor vehicle based on the real-time static and dynamic data from the one or more sensors;
adaptively predicting tire forces at each tire of the motor vehicle at each of the one or more incremental time steps to compensate for effects of tire deformation, tire wear, tire temperature, tire inflation pressure, and a coefficient of friction of a surface in contact with the tire at a contact patch;
generating one or more control commands for the one or more actuators of the motor vehicle; and
capturing discrepancies between real-time force estimations and nominal force calculations at each tire of the motor vehicle, and applying compensation parameters to reduce tracking errors in the one or more control commands to the one or more actuators of the motor vehicle, wherein the compensation parameters include:
  quantifying tire deformation in terms of longitudinal and lateral slip including a slip angle and a slip ratio, wherein slip angle and slip ratio are defined respectively by:

$$\alpha_{i,j} = \tan^{-1}\left(\frac{v_{y_{ij}}}{v_{x_{ij}}}\right), \kappa_{i,j} = \frac{(R_e \omega_{i,j} - v_{x_{ij}})}{v_{x_{ij}}}$$

wherein actual tire forces are mathematically defined by:

$$\min_{c_1,c_2,c_3,c_4,c_5} \sum_i^n (F_z \mu_{x_i} - y_i)^2$$

where $y_i$ represents a force calculation for each of the tires of the motor vehicle, and wherein coefficients $c_1$, $c_2$, $c_3$, $c_4$, $c_5$ are based on actual tire forces in different slip angles and different normal forces using nonlinear least squares data; and
predicting tire forces based on predicted state variables and the model of forces on each of the tires of the motor vehicle in X and Y directions is defined as:

$$F_{x_{i,j}} = F_{z_{i,j}} \mu^*_{x_{i,j}} \frac{\kappa_{i,j}}{|\kappa_{i,j}|} \min(c_1 \min(c_4|\kappa_{i,j}| + c_5, |\kappa_{i,j}|), c_2 \min(c_4|\kappa_{i,j}| + c_5, |\kappa_{i,j}|) + c_3);$$

$$F_{y_{i,j}} = F_{z_{i,j}} \mu^*_{y_{i,j}} \frac{\alpha_{i,j}}{|\alpha_{i,j}|} \min(c_1 \min(c_4|\alpha_{i,j}| + c_5, |\alpha_{i,j}|), c_2 \min(c_4|\alpha_{i,j}| + c_5, |\alpha_{i,j}|) + c_3);$$

and
wherein the tire forces are utilized to calculate state variables such as wheel angular velocities according to the following equation: $J_w \dot{\omega}_{i,j} = T_{i,j} - R_e F_{x_{i,j}}$.

* * * * *